United States Patent [19]

Whitaker

[11] Patent Number: 4,762,256

[45] Date of Patent: Aug. 9, 1988

[54] CONVERTIBLE STROLLER-BACKPACK BABY CARRIER

[76] Inventor: Len Whitaker, 1806 Wright St., Pomona, Calif. 91766

[21] Appl. No.: 932,746

[22] Filed: Nov. 19, 1986

[51] Int. Cl.⁴ ............................................. A61G 1/00
[52] U.S. Cl. .................................... 224/161; 224/155; 224/201; 280/30; 280/643; 297/4
[58] Field of Search ............... 224/155, 161, 153, 158, 224/159, 160, 201; 280/30, 642, 643, 47.25; 297/130, 254, 4

[56] References Cited

U.S. PATENT DOCUMENTS

| | | | |
|---|---|---|---|
| 642,210 | 1/1900 | Deutesfeld | 280/643 |
| 3,690,525 | 9/1972 | Koons | 224/155 |
| 3,881,644 | 5/1975 | Demaline | 224/201 X |
| 3,984,115 | 10/1976 | Miller | 280/30 |
| 4,157,837 | 6/1979 | Kao | 280/30 |
| 4,620,711 | 11/1986 | Dick | 280/30 |

Primary Examiner—Henry J. Recla
Assistant Examiner—David Voorhees
Attorney, Agent, or Firm—Nilsson, Robbins, Dalgarn, Berliner, Carson & Wurst

[57] ABSTRACT

A baby carrier device which is convertible to function as either a baby stroller or as a baby backpack.

15 Claims, 2 Drawing Sheets

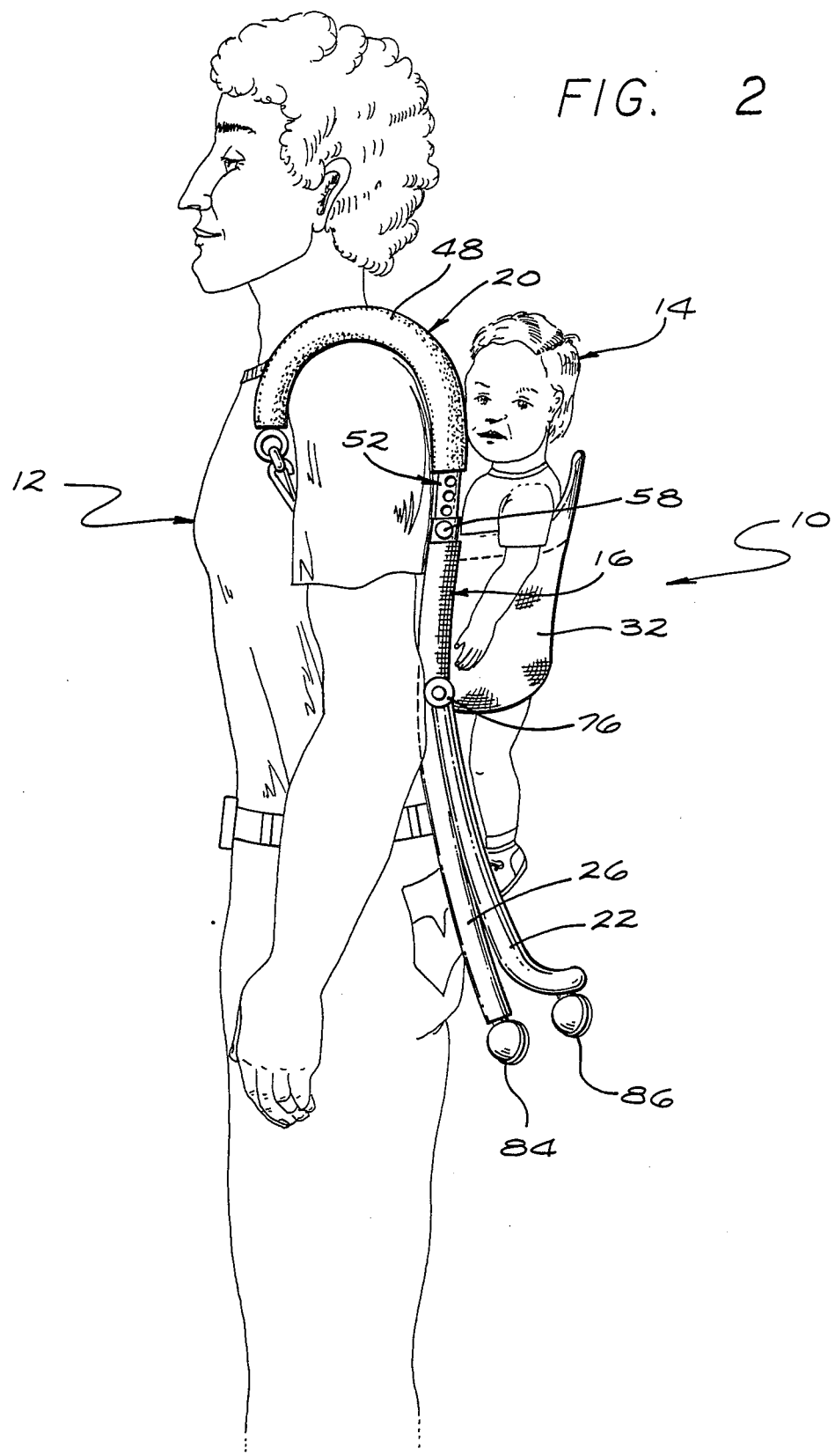

CONVERTIBLE STROLLER-BACKPACK BABY CARRIER

BACKGROUND OF THE INVENTION

The invention relates to the field of baby carriers, specifically to a baby carrier which is convertible to function either as a baby stroller or as a baby backpack.

Small children have traditionally been transported about in wheeled carriers such as strollers or carriages. A baby carrier of this type, while adequate for its intended purpose, is cumbersome and difficult to use over rough terrain.

A recent innovation in the field of baby carriers is the development of backpacks which allow small children to be carried upon one's back. These backpack carriers are particularly useful for carrying children over terrain not suitable for use with wheeled strollers or carriages, and also particularly useful for carrying small children in crowded areas. An example of a child backpack carrier is disclosed in U.S. Pat. No. 3,421,670, issued to Margaret S. Hansson, on Jan. 14, 1969.

Both the wheeled baby carriers and the baby backpack carriers are widely used for transporting small children. However, as a result of the increasing desire on the part of parents to bring their children with them while participating in various activities, the need has developed for a carrier which is convertible to either a baby stroller or a baby backpack carrier. By having a carrier convertible to function either as a wheeled stroller or a baby backpack carrier, the need to carry both types of carriers is eliminated.

Examples of devices which are convertible to function as either a baby backpack or stroller are disclosed in U.S. Pat. No. 3,094,115, issued to Miller on Oct. 5 1976; U.S. Pat. No. 4,157,837, issued to Kao on June 12 1979; and U.S. Pat. No. 4,487,428, issued to Harada et al. on Dec. 11, 1984.

In general, the convertible stroller/backpack carriers disclosed by these references are awkward when positioned on one's back due to the numerous collapsible or folding legs attached to the carrier main frame. A further disadvantage with presently available convertible stroller/backpack carriers is the manner by which these carriers are hoisted upon an individual's back. Basically, these carriers include two shoulder straps attached to the frame, with a first of these straps slipped over one shoulder prior to slipping the second strap over the other shoulder. Each strap adjusts to a comfortable length. Prior to slipping on the second strap, the carrier must be wrestled up off the ground, with or without the assistance of another person. The upward lifting of the carrier is particularly difficult when the child is sitting in the carrier, and thus in most cases, the assistance of a second person is needed to raise and mount the backpack on the wearer's back.

There thus exists the need to provide a convertible stroller/backpack carrier which is not awkward or difficult to hoist up on one's back.

SUMMARY OF THE INVENTION

The invention accomplishes the above objectives by providing a convertible baby stroller/backpack carrier which includes arcuately shaped handles that are hooked over an individual's shoulders to support the carrier on that individual when worn as a backpack.

Specifically, the baby stroller/backpack carrier of the invention includes a pair of arcuately shaped handles extensibly coupled to the carrier frame. These handles are protracted for a length from the frame to allow the handles to be gripped when the device is utilized as a wheeled stroller and retracted to the frame to place the handles in a suitable position for placement over the individual's shoulders when the device is worn as a backpack.

A collapsible leg, which is movably secured to the frame, can be pulled out therefrom to form, in combination with the frame, a base upon which the device is rested when used as a stroller. In order to allow movement of the stroller, wheels are secured to the leg and the frame.

The device of the invention is simple in construction and easier to use as a backpack carrier since the arcuately shaped handles function as hooks.

DESCRIPTION OF THE DRAWINGS

The present invention may be better understood and its numerous advantages will be apparent to those skilled in the art by reference to the accompanying figures, wherein like reference numerals refer to like elements in the several figures, and wherein:

FIG. 2 is a side perspective view of the carrier device of FIG. 1 shown mounted upon an individual's back with an infant positioned in the carrier seat.

DESCRIPTION OF THE INVENTION

Figure 1:
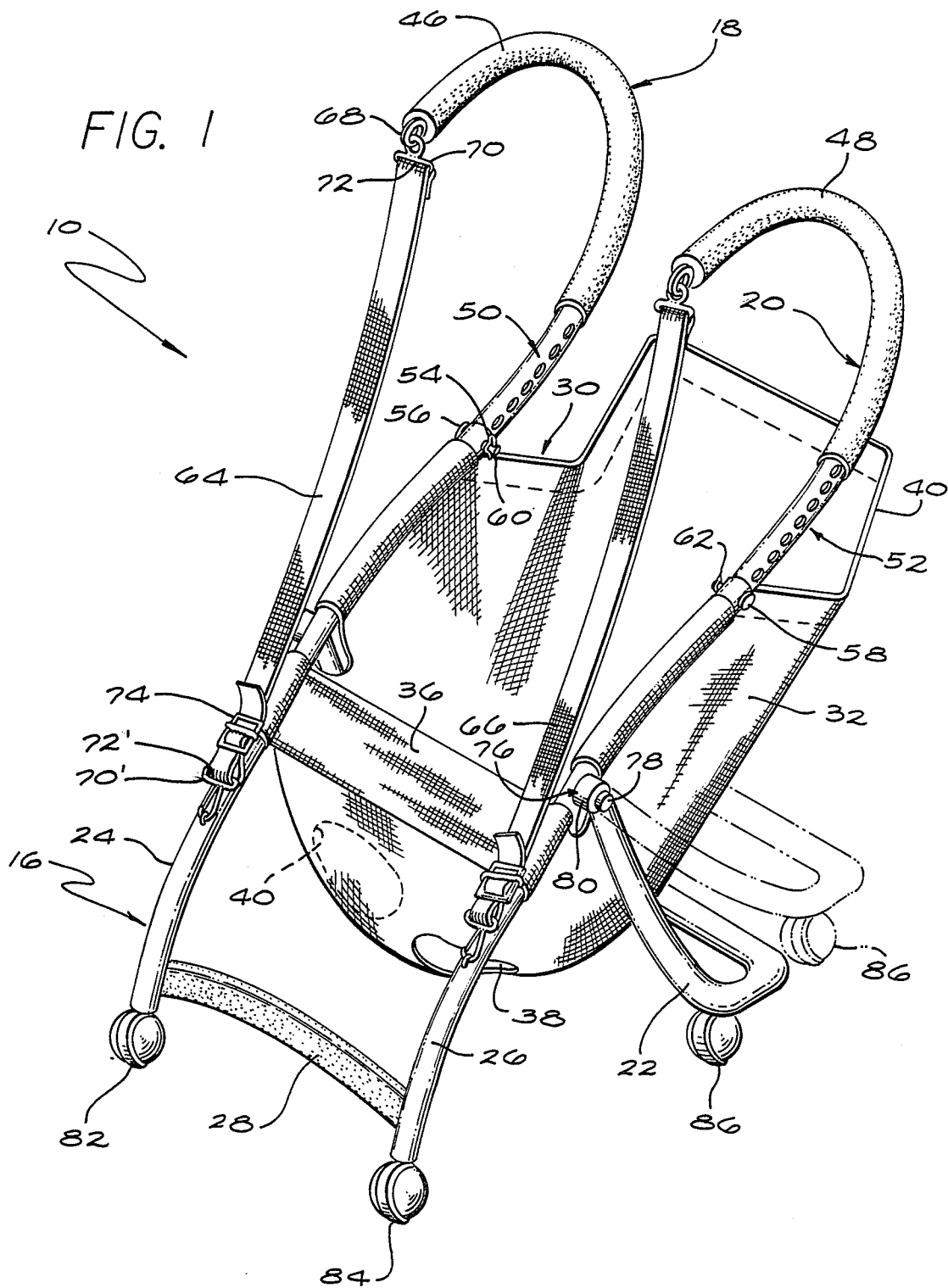
FIG. 1 is a perspective view of a carrier device of the invention unfolded for use as a stroller.

The invention is a baby carrier convertible to form either a baby stroller or a baby backpack.

Referring simultaneously to FIGS. 1 and 2, the convertible backpack/stroller carrier of the invention is seen generally at 10. In FIG. 1 the carrier 10 is illustrated in an unfolded position for use as a stroller, while in FIG. 2 the carrier 10 is shown in a substantially collapsed position and worn by an individual 12 as a backpack, with an infant 14 held in the carrier 10.

The carrier 10 includes a frame 16 with a pouch 32 secured thereto. A pair of handles 18 and 20 are extensibly mounted to the frame 16, with a leg 22 movably mounted to the frame to allow it to be folded out therefrom. The handles 18 and 20 are each formed with an arcuately shaped portion normally positioned above the frame 16. These arcuately shaped portions, indicated at 46 and 48, are gripped by the individual 12 when the carrier 10 is used as the stroller, as illustrated in FIG. 1. When the carrier 10 is used as a backpack, as illustrated in FIG. 2, the handles' arcuately shaped portions 46 and 48 are placed on the individual 12's shoulders.

By forming the handles 18 and 20 with these arcuately shaped portions 46 and 48, the carrier 10 is easily mounted on the individual 12's shoulder in comparison to presently available convertible stroller/backpack carriers, as exemplified by the above-referenced patents. In use, the carrier 10 is lifted up off the ground, typically by the handles 18 and 20, with the handles' arcuately shaped portions 46 and 48 hooked over the shoulders, with or without the assistance of another person.

The frame 16 is formed by two side struts 24 and 26 oriented substantially parallel to each other and joined together by a lower cross member 28 and an upper headrest cross member 30. The side struts 24 and 26, which while being substantially straight are slightly curved at their lower ends, as better seen in FIG. 2, to substantially conform to the shape of the back of the individual. The shape of the struts 24 and 26 allows the carrier 10 to rest comfortably against the individual 12 when worn as a backpack. To enhance the comfort of carrying the carrier 10 on one's back, the two cross members 28 and 30 are arched outward, away from the individual 12. Further, the lower cross member 28 is positioned between the side struts 24 and 26 at the lower most end of the frame 16, with that portion of the lower cross member 28 which will rests against the individual 12's lower back covered with a foam or similar cushion-like material. The illustrated shaping and positioning of the cross-members 28 and 30 is preferred to enhance the comfort of the carrier 10 when worn as a backpack.

In a preferred embodiment, as illustrated, the headrest cross member 30 is formed with an upwardly angled portion 40. The remainder of the cross member 30 juts substantially straight out from the rear of the frame 16, with this upwardly angled portion 40 being substantially parallel with the struts 24 and 26. When the infant 14 is positioned in the pouch 32 it can rest its head against this upwardly angled portion 40 when the carrier 10 is utilized as either a backpack or as a stroller.

The pouch 32, into which the infant 14 is placed, is bounded along its sides to the side struts 24 and 26 and the headrest cross member 30. The pouch 32, which is formed of a cloth material, is bound to the side struts 24 and 26, and headrest cross member 30, by wrapping the respective sides of the pouch 32 about such struts 24 and 26 and cross member 30 and sewing, or in some other manner sealing the wrapped around ends to the remainder of the pouch 32. This manner of binding the pouch 32 to the struts 24 and 26 and cross member 20 is illustrated by the rolled sides of the pouch 32 shown along the side struts 24 and 26.

The lowermost side of the pouch 32 is stretched taut between the struts 24 and 26 to form a back wall 36. This back wall 36 will rest along the lower back of the individual 12 when the carrier 10 is worn as a backpack to provide a more comfortable fit of the carrier 10 on the individual 12's back.

The pouch 32 is also formed with a least a first pair of leg holes 38 and 40, with leg hole 40 shown in phantom. These leg holes 38 and 40 are formed in that portion of the pouch 32 lying below the back wall 36 to allow the infant 14's legs to hang. An additional pair of leg holes, not shown, may be formed in the pouch 32 to allow the infant 14 to be placed at different positions in the pouch 32.

As stated, the handles 18 and 20 are extensibly mounted to the side struts 24 and 26 of the frame 16 to allow for their protraction from and retraction to the frame 16. As illustrated, the substantially straight lengths of the handles 18 and 20 are slidably received in the side struts 24 and 26, which are formed from elongated tubular bodies having inner diameters slightly larger than the outer diameters of the straight lengths of the handles 18 and 20. This arrangement allows the handles 18 and 20 to be pulled out from and slide back into the respective struts 24 or 26.

The handles 18 and 20 are suitably secured in relation to the respective struts 24 and 26 along their lengths by any means. As illustrated, each of the straight lengths of the handles 18 and 20 include a series of apertures, indicated respectively at 50 and 52, with each of these apertures independently alignable with a pair of coaxial holes formed through each of the side struts 24 and 26, with one such hole formed in strut 24 indicated at 54. A stud, two of which are indicated at 56 and 58, is slid through the pair of holes of either of the side struts 24 or 26, and one of the aligned apertures formed in the respective of the handles 18 or 20. Each of these studs 56 and 58 are retained through the aligned holes and apertures by lockably placing a cotter pin, two of which are indicated respectively at 60 and 62, through a hole appropriately formed through that end of each of the studs 56 and 58 which extends out through the aligned holes.

By securing each of the handles 18 and 20 at a desired pulled out length from the side struts 24 and 26, the handles' arcuately shaped portions 46 and 48 are properly placed for grasping when the carrier 10 is utilized as a stroller. The retracting and securing of the handles 18 and 20 into the side struts 24 and 26 places the arcuately shaped portions 46 and 48 at a position so that when hooked over the individual 12's shoulders the carrier 10 is properly placed when worn as a backpack.

The carrier 10 when worn as a backpack is further secured on the individual by two straps 64 and 66 which are separately attached, by any suitable technique, to the ends of the handles' arcuately shaped portions 46 and 48 and the respective side struts 24 and 26 to which the handles 18 and 20 are extensibly mounted. For example, an eyelet, one of which is indicated at 68, is attached to the end of the arcuately shaped portion 46, with a clip 70 secured therethrough. The clip 70 defines a slot 72 through which one end of the strap 64 is slipped and then bound back upon itself. The other end of the strap 64 is slipped through a buckle 74 and then further slipped through a slot 72 of another clip 70 which is attached to the strut 24. The strap 64 is then adjustably fed back through the buckle 74 to allow for the adjustment of its length. In this manner the straps 64 and 66 are tightened to snugly fit the carrier 10 on the individual The leg 22 is pivotally mounted to the frame 16, allowing it to be folded against the frame 16, or unfolded out from the frame 16, to provide, in combination with the frame 16, a base upon which the carrier 10 is rested. As shown, the leg 22 is a generally U-shaped bar having each of its two ends pivotally mounted in a suitable manner to the respective side struts 24 or 26. For example, each of the respective ends of the U-shaped leg 22 are coupled to a pivotal mount, one of which being illustrated at 76, which is itself mounted to the strut 26. This pivotal mount 76 is suitably constructed to allow the leg 22 to be pulled outward and locked in at least a first position away from the frame 16, as illustrated in FIG. 1. Preferably, the pivotable mount 76 allows the leg 22 to be pulled outward and locked in at least two positions away from the frame 16, a second of such positions being shown phantomly in FIG. 1.

One suitable pivotal mounting mechanism is a device wherein an outer hollow casing, illustrated at 80, is secured directly to one of the ends of the leg 22. This hollow casing 80 is rotatably mounted over a hub, not shown, extending out from the side of the strut 26. A spring biased button 78, which extends out through an aperture formed in the casing 80, engages and operates a locking mechanism similar to a conventional ratchet assembly, which secures the hub 80 at a rotational position about the stud. By appropriately constructing this locking mechanism the leg 22 can be held at one or more positions when pulled out from the frame 16.

The convertible backpack/stroller carrier 10 further includes two pairs of caster wheels mounted to the bottom of both the frame 16 and leg 22. A first pair of such caster wheels 82 and 84 is secured to the lowermost ends of the side struts 24 and 26, with a second pair of the caster wheels, only one of which being shown at 86, secured in a spaced-apart relationship to leg 22.

The caster wheels are secured to the ends of the struts 24 and 26, and the leg 22 to extend away from the individual's back when the carrier 10 is worn as a backpack. This reduces the risk of the caster wheels, which in all probability have picked up dirt from the ground, rubbing against the individual 12's clothing. As already stated, the side struts 24 and 26 are formed to slightly curve away, at their lowermost ends, from the individual 12. By securing the caster wheels 82 and 84 at these ends, they will normally extend away from the individual 12. Those caster wheels secured to the leg 22 will normally be disposed away from the individual's clothing because of the relationship of the leg 22 to the remainder of the frame 16. However, it is desirable to form the leg 22 so that it can be rested substantially along the length of the adjoining of the struts 24 and 26. In this fashion the lowermost portion of the leg 22 is bent away from the frame 16 to place it substantially parallel to the ground when the carrier 10 is used as a stroller.

While the preferred embodiments have been described and illustrated, various modifications and substitutions may be made thereto without departing from the spirit and the scope of the invention. Accordingly, it is to be understood that the present invention has been described by way of illustration and not limitation.

What is claimed is:

1. A device convertible to form a baby stroller or baby backpack comprising:
   a rigid frame structure formed by two elongated, substantially parallel and spaced apart struts which are joined together by at least a first transverse cross member;
   seat means secured to said frame for receiving and supporting a small child;
   at least two handles, each of which is extensibly coupled to one of said struts to allow said handle to be protracted out from and retracted to said strut, with a portion of each of said handles being arcuately shaped for positioning on an individual user's shoulders;
   means for retaining said frame strut and said extensibly coupled handle at a desired position with respect to each other;
   at least a first frame leg pivotally supported by said frame struts for movement from a substantially collapsed position on said frame to at least a first extended position away from said frame, wherein said leg and said frame define in combination a base upon which said device is supported; and
   wheel means secured to said frame and said frame leg for allowing said device to be wheeled about thereon.

2. The device of claim 1 wherein said frame includes a second transverse member spatially separated from said first transverse member connecting said struts.

3. The device of claim 2 wherein said first and second transverse members are outwardly curved in a direction, whereby said members will be displaced away from said individual when said device is worn by said individual as a backpack.

4. The device of claim 2 wherein each of said handle arcuately shaped portions are directed in a first direction, and each of said first and second transverse members are outwardly curved in a direction opposite the direction said handle arcuately shaped portions are directed.

5. The device of claim 4 wherein said second transverse member includes a portion which is spatially displaced from said frame and bent upwards to be substantially parallel to said frame.

6. The device of claim 1 wherein said wheel means are secured to said frame and frame leg in a manner to extend rearwardly of said frame when said device is worn as a backpack.

7. The device of claim 2 wherein a lower portion of each of said frame struts are slightly curved in a direction away from said individual when said device is worn as a backpack, with said frame leg being compatibly curved, whereby when said device is worn as a backpack said lower portion of said frame and frame leg will curve away from said individual.

8. The device of claim 5 wherein a lower portion of each of said frame struts are slightly curved in a direction away from said individual when said device is worn as a backpack, with said frame leg being compatibly curved, whereby said frame and said frame leg will curve away from said individual when said device is worn as a backpack.

9. The device of claim 7 wherein each of said handles are extensibly coupled to said frame by a portion thereof which is slidably receivable in a respective of said frame struts.

10. The device of claim 9 wherein each of said handle portion slidably received in a respective of said frame struts are elongated substantially straight portions received in said struts, which struts are elongated hollow tubular bodies.

11. The device of claim 10 wherein said device further includes two straps, each of which strap is secured at one end to one of said handle arcuately formed portions and at a second opposite end to said frame.

12. The device of claim 11 wherein said strap is coupled to either said frame or said handle arcuately shaped portion by a means allowing said strap to be adjustable in length.

13. The device of claim 12 wherein said retaining means includes a first series of apertures formed through each of said handles elongated substantially straight portions, with each of which apertures individually alignable with an aperture formed through said hollow tubular strut and a pin positionable and releasably secured through such aligned apertures.

14. The device of claim 13 wherein said handle arcuately shaped portions are padded with a foam or foam-like material.

15. The device of claim 14 wherein said frame leg is releasably locked in at least a second extended position out from said frame.

* * * * *